(12) United States Patent
Devaraju (10) Patent No.: US 11,775,371 B2
(45) Date of Patent: Oct. 3, 2023

(54) REMOTE VALIDATION AND PREVIEW

(71) Applicant: StreamSets, Inc., San Mateo, CA (US)

(72) Inventor: Madhukar Devaraju, San Jose, CA (US)

(73) Assignee: StreamSets, Inc., San Mateo, CA (US)

( * ) Notice: Subject to any disclaimer, the term of this patent is extended or adjusted under 35 U.S.C. 154(b) by 492 days.

(21) Appl. No.: 16/881,799

(22) Filed: May 22, 2020

(65) Prior Publication Data

US 2021/0365312 A1 Nov. 25, 2021

(51) Int. Cl.
*G06F 9/44* (2018.01)
*G06F 11/07* (2006.01)
*G06F 9/54* (2006.01)
*G06F 3/0482* (2013.01)
*G06F 21/30* (2013.01)

(52) U.S. Cl.
CPC ........ *G06F 11/0772* (2013.01); *G06F 3/0482* (2013.01); *G06F 9/544* (2013.01); *G06F 11/0751* (2013.01); *G06F 21/30* (2013.01)

(58) Field of Classification Search
CPC .... G06F 11/0772; G06F 9/544; G06F 3/0482; G06F 11/0751; G06F 21/30
USPC .................................................. 717/101–108
See application file for complete search history.

(56) References Cited

U.S. PATENT DOCUMENTS

2007/0150624 A1\* 6/2007 Moore .................. G06F 13/122
710/5
2015/0277900 A1\* 10/2015 O'Keeffe .................. G06F 8/70
717/113

\* cited by examiner

*Primary Examiner* — Chuck O Kendall
(74) *Attorney, Agent, or Firm* — Schwegman Lundberg & Woessner, P.A.

(57) ABSTRACT

Systems and methods are directed to remote validation and preview. An example system receives an indication of a portion of the data pipeline to be processed, generates a data pipeline configuration file describing operations in the portion of the data pipeline, causes a software framework to perform operations corresponding to the portion of the data pipeline, receives results of the operations corresponding to the portion of the data pipeline, and causes presentation of the results on a graphical user interface of a computing device.

20 Claims, 7 Drawing Sheets

REMOTE VALIDATION AND PREVIEW

TECHNICAL FIELD

Embodiments of the present disclosure generally relate to previewing data pipeline performance. More particularly, but not by way of limitation, the present disclosure addresses systems and methods for remote validation and preview of a data pipeline.

BACKGROUND

Previewing performance and validating results of a data pipeline prior to executing the pipeline improves the accuracy of data flow within a data pipeline.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for remote validation and preview of a data pipeline. In some embodiments, the data pipeline describes a flow of data from origin systems to destination systems and defines how to transform the data along the way. An origin is a data connecter (e.g., computer software) that can be used to access data from a data source. A destination, in contrast, writes data to a specified location. Each data pipeline may comprise two or more distinct points, also referred to as stages. There are three types of stages: origin stages, processor stages, and destination stages. Origin stages are stages that read data from data sources (e.g., other data systems). Processor stages are stages that apply some form of processing (e.g., receives input data and produces output data). Example processing tasks include extract, transform, load (ETL) procedures, stream processing, and machine learning operations. Destination stages are stages that write data out into destinations.

Each data pipeline has an origin stage. The data in the data pipeline can be processed in multiple ways before it reaches the destination(s). As such, there are multiple processor stages to transform the data, and resultant data can be written to multiple locations (e.g., destination stages).

In some embodiments, a transformation system may be configured to run data pipelines on a cluster-computing framework. The data pipelines can perform transformations that require heavy processing on the entire data set. The transformation execution engine may be installed on a machine that is configured to submit computation tasks to a computer cluster (e.g., a group of inter-connected computers that work together to perform computationally intensive tasks). A user may utilize a web browser to access a control interface which may be used to design and run the data pipelines. The transformation execution engine submits the data pipelines as a job to the computer cluster.

In some embodiments, a user-interface system accesses a data pipeline from a web-based platform. The web-based platform may be part of the transformation system. The data pipeline comprises a series of data operations related to a set of data. For example, the data operations may include receiving the set of data from data sources, processing the set of data by applying data transformations on the set of data, and writing the processed set of data out to destinations. A user of a computing device can configure the data pipeline from the user-interface system. For example, a user can configure the data pipeline to read from specified data sources, configure the schema fields for the data pipeline, and specify the various operations to be performed on the data before writing the processed data out to destinations.

Retrieving data from a remote location is a challenge and showing a snapshot of a submission (e.g., APACHE SPARK job submission) to the cluster-computing framework (e.g., APACHE SPARK) within the transformation system is difficult due to the distributed nature of the framework. For example, while processing a basic use case (e.g., a single node APACHE SPARK instance), which is available on one local machine, may be supported by the transformation system, more complex use cases, which rely on multiple software libraries and have dependency conflicts, need to be processed differently. Complex use cases include any type of task (e.g., machine learning) that involves parallel processing of large amounts of data. In complex uses cases, the database cluster (e.g., the data pipeline stages) exists on multiple machines. Network latency or speed of any one of the nodes (e.g., a computer in the cluster) can be impacted. Accordingly, systems and methods describe generating a local instance of a database cluster (e.g., data pipeline represented as an APACHE SPARK cluster) within the transformation system.

In example embodiments, the transformation system accesses a data pipeline configuration file. The data pipeline configuration file describes operations (e.g., stages) in the data pipeline. The data pipeline configuration file may be a JavaScript Object Notation (JSON) file and may further describe credentials to run the data pipeline and authentication information. The data pipeline configuration file is submitted as a job (e.g., APACHE SPARK job) to a software framework (e.g., APACHE SPARK) using an application programming interface (API) (e.g., APACHE SPARK API). The software framework performs at least some of the operations in the data pipeline using the data pipeline configuration file. The transformation system then receives from the software framework, results of the operations performed by the software framework. In some examples, the results are the data that was transformed as a result of the operations performed by the software framework. In some examples, the results include error notifications or other information about the data pipeline.

Figure 1:
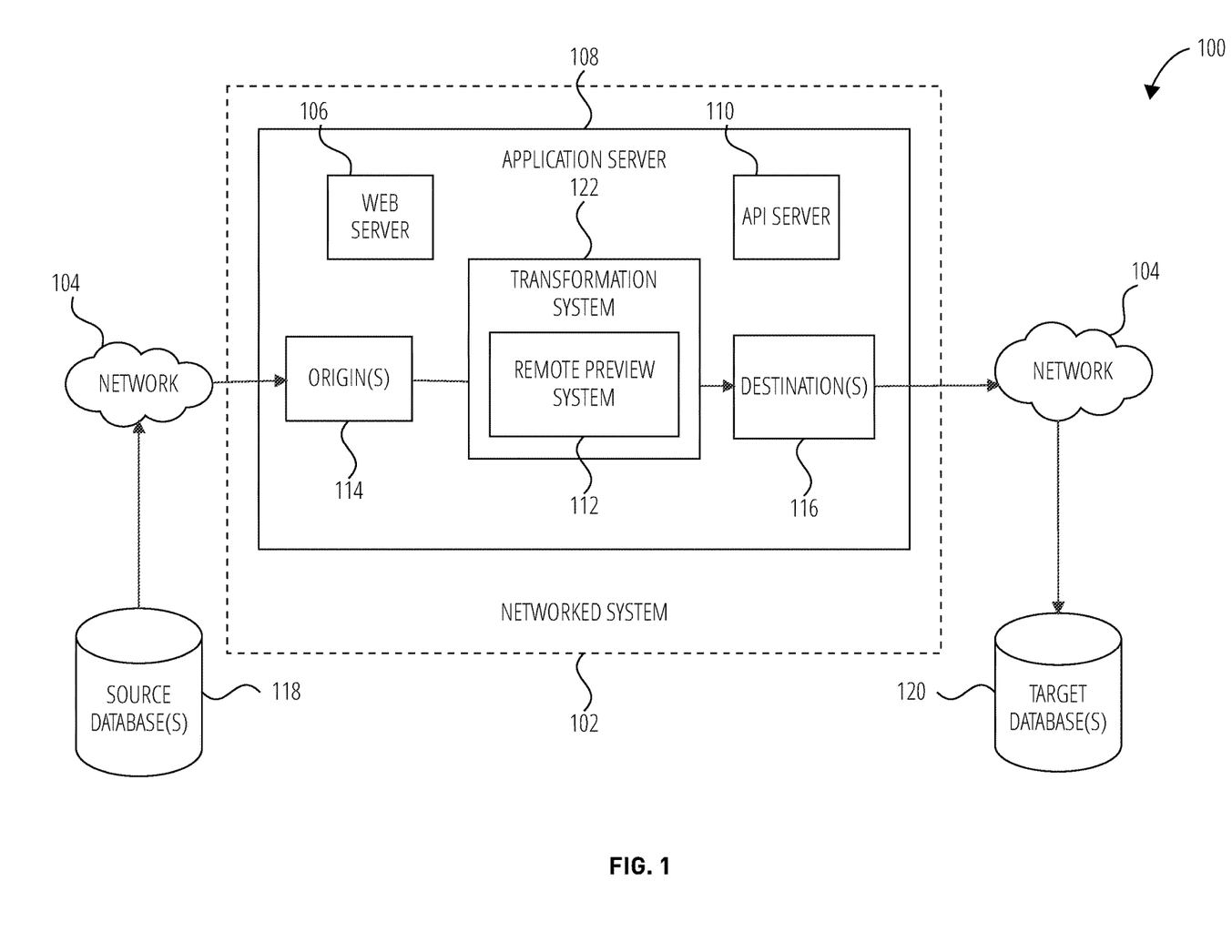
FIG. 1 is a network diagram depicting a computer system within which a remote preview system may be deployed, according to some embodiments.

FIG. 1 is a diagram illustrating a network environment 100 suitable for performing remote preview and validation of data pipelines, in accordance with example embodiments. The network environment 100 includes a networked system 102 communicatively coupled via a network 104 to a database (e.g., source database(s) 118, target database(s) 120). In example embodiments, the networked system 102 comprises components that perform remote preview and validation of data pipelines. The components of the networked system 102 are described in more detail in connection with FIG. 2 and may be implemented in a computer system, as described below with respect to FIG. 7.

FIG. 1 illustrates, for example, a data pipeline with origin(s) 114 and destination(s) 116, and a transformation system 122. The origin(s) 114 may be configured to connect to source database(s) 118 via the network 104. The transformation system 122 receives data from the origin(s) 114 and performs one or more transformation operations on the data. The transformation system 122 submits the transformed data to the destination(s) 116. In example embodiments, the transformation system 122 includes a remote preview system 112. The remote preview system 112 is configured to perform remote preview and validation of data pipelines.

The networked system 102 provides server-side functionality via the network 104 (e.g., the Internet or Wide Area Network (WAN)) to one or more data storage systems. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

An Application Program Interface (API) server 110 and a web server 106 are coupled to, and provide programmatic and web interfaces respectively to, an application server 108. The application server 108 hosts the transformation system 122. The transformation system 122 may thus facilitate data transformations and provide a user-interface for the creation and distribution of computer applications using the remote preview system 112. The application server 108, in turn, may be coupled to a database server (not shown) that facilitates access to the source database(s) 118 and target database(s) 120.

While the transformation system 122 is shown in FIG. 1 to form part of the networked system 102, it will be appreciated that, in alternative embodiments, the transformation system 122 may form part of a service that is separate and distinct from the networked system 102. Similarly, while the remote preview system 112 is shown to form part of the networked system 102, it will be appreciated that, in alternative embodiments, the remote preview system 112 may form part of a service that is separate and distinct from the networked system 102.

Further, the network environment 100 is, of course, not limited to such an architecture as shown in FIG. 1. Any portion or portions of the transformation system 122 and the remote preview system 112 may reside and be executed from any kind of computing device. The transformation system 122 and the remote preview system 112 can also be implemented as standalone software program(s), which does not necessarily have networking capabilities.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 2:
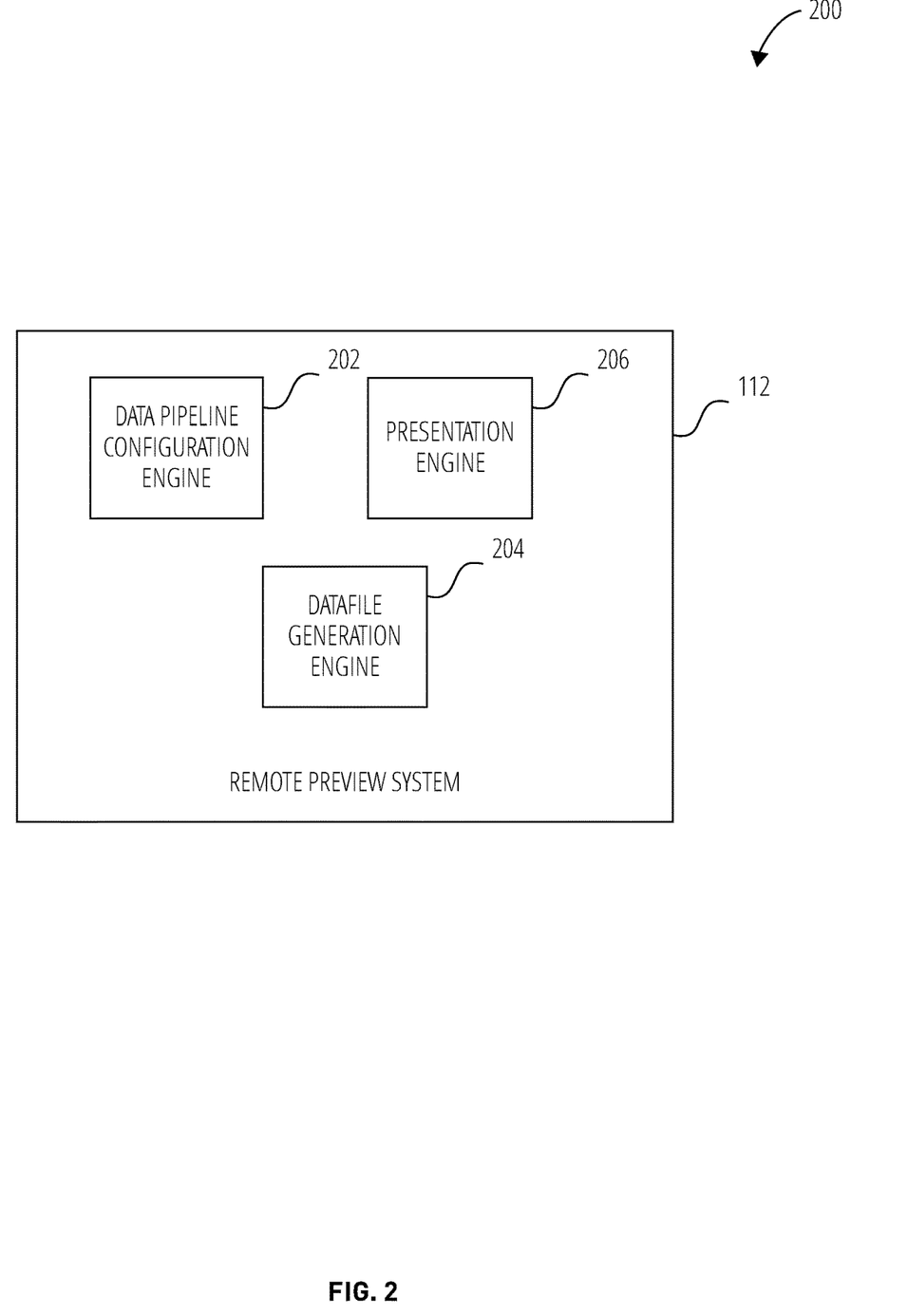
FIG. 2 is a block diagram showing components of a remote preview system, according to some example embodiments.

FIG. 2 is a block diagram showing components of the remote preview system 112, according to some example embodiments. The remote preview system 112 performs remote preview and validation of data pipelines. To enable these operations, the remote preview system 112 comprises a data pipeline configuration engine 202, a datafile generation engine 204, and a presentation engine 206.

The data pipeline configuration engine 202 receives user input to create a data processing pipeline on a web-based platform. For example, the data pipeline configuration engine 202 receives the user input from a computing device as a result of the user using an input device of the client device, such as by electing a button, tapping a user interface element, providing an audio input via a microphone, or the like. For example, the user may select user interface elements to represent different stages in a data processing pipeline.

The data pipeline may thus be displayed as user interface elements within a graphical user interface of the web-based platform. The user can configure the data sources (e.g., origin(s) 114) and destinations (e.g., destination(s) 116) to be used within the data pipeline.

The datafile generation engine 204 generates a datafile representing the data pipeline. The datafile generation engine 204 may generate the datafile in response to receiving a selection of a user interface element within the graphical user interface. In some embodiments, the datafile generation engine 204 may generate a first type of datafile in response to receiving a selection of a first user interface element. For example, the first type of datafile may represent the entire data processing pipeline. In some embodiments, the datafile generation engine 204 may generate a second type of datafile in response to receiving a selection of a second user interface element. The datafile generation engine 204 may determine which type of datafile to generate based on the received selection. For example, if the datafile generation engine 204 receives a selection of a button labeled "Run," the datafile generation engine 204 may generate the first type of datafile. If the datafile generation engine 204 receives a selection of a button labeled "Preview," the datafile generation engine 204 may generate the second type of datafile. For example, the second type of datafile may represent a portion of the data pipeline. In some embodiments, the datafile is a JSON file.

The presentation engine 206 modifies the graphical user interface with results of the data pipeline. For example, the presentation engine 206 may display graphs, charts, or any other visualizations of the results. The presentation engine 208 may update the graphical user interface within the web-based platform in real-time or near real-time as the data is moving through the data processing pipeline.

Figure 3:
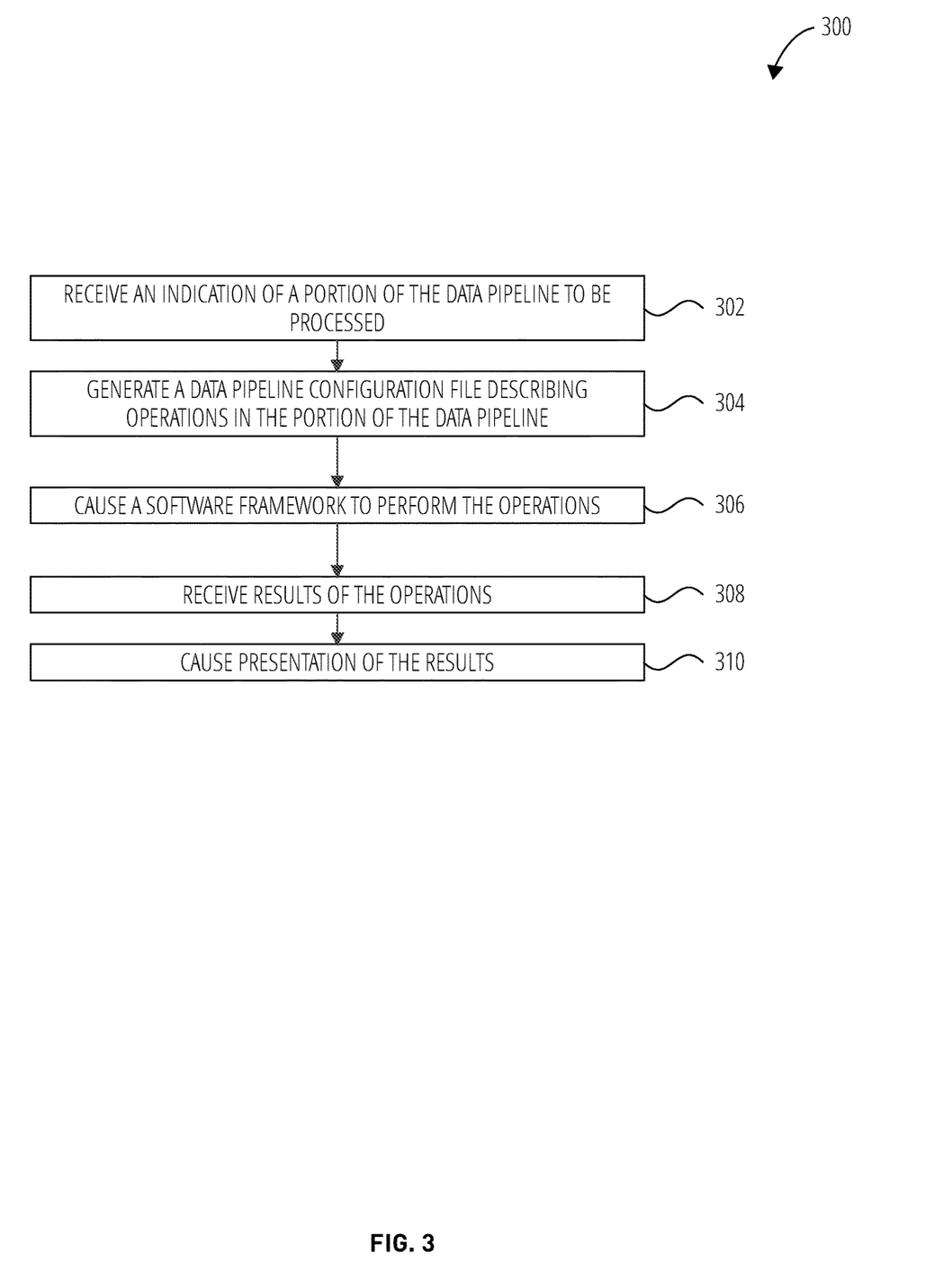
FIG. 3 is a flowchart of an example method for remote preview and validation of a data pipeline, according to some example embodiments.

FIG. 3 is a flowchart of an example method 300 for remote preview and validation of a data pipeline, according to some example embodiments. Operations in the method 300 are performed by the networked system 102, using components described above with respect to FIG. 1 and FIG. 2 Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

At operation 302, the remote preview system 112 receives via a user interface, an indication of a portion of the data pipeline to be processed. The user input is received via a graphical user interface of a computing device. The user input specifies, for example, which portions of the data pipeline should be processed by the software framework. For example, the remote preview system 112 receives the user input from the computing device as a result of the user using an input device of the computing device, such as by electing a button, tapping a user interface element, providing an audio input via a microphone, or the like.

In some embodiments, the remote preview system 112 causes presentation of a user configuration window. For example, the user configuration window provides user interface elements for specifying the portion of the data pipeline to be processed. The remote preview system 112 detects, via the user configuration window, user input specifying the portion of the data pipeline to be processed by the software framework.

At operation 304, the remote preview system 112 generates a data pipeline configuration file describing operations in the portion of the data file. In some examples, the data pipeline configuration file includes information about all the data sources (e.g. origin(s) 114) and the destination(s) 116. The data pipeline configuration file can further include data pipeline credential information (e.g., JAVA DATABASE CONNECTIVITY (JDBC) Connection URL, JDBC Username, and JDBC Password). In some embodiments, operation 304 is performed by the datafile generation engine 204.

At operation 306, the remote preview system 112 causes a software framework, using an API (e.g., using the API server 110), to perform operations corresponding to the portion of the data pipeline. For example, the software framework performs the operations based on the datafile configuration file that was generated at operation 304. The software framework is configured to perform at least some of the operations in the data pipeline using the data pipeline configuration file. For example, the software framework may be the APACHE SPARK framework. In some embodiments, the portion of the data pipeline to be processed is distributed amongst multiple computers using the software framework.

In some embodiments, the remote preview system 112 transmits offset information of the data pipeline to the software framework. The offset information provides information on how to restart the data pipeline from the last batch of data that was processed. In some examples, the offset information represents the beginning of the data pipeline.

At operation 308, the remote preview system 112 receives results of the operations performed in the data pipeline by the software framework. In some embodiments, the results include the data that was transformed by the operations performed in the data pipeline by the software framework. In some embodiments, the results include error notifications due to a failure in the data pipeline.

At operation 310, the remote preview system 112 causes presentation of the results on a graphical user interface of a computing device. For example, the remote preview system 112 may modify the graphical user interface of the computing device with the results. In some embodiments, operation 310 is performed by the presentation engine 206.

Figure 4:
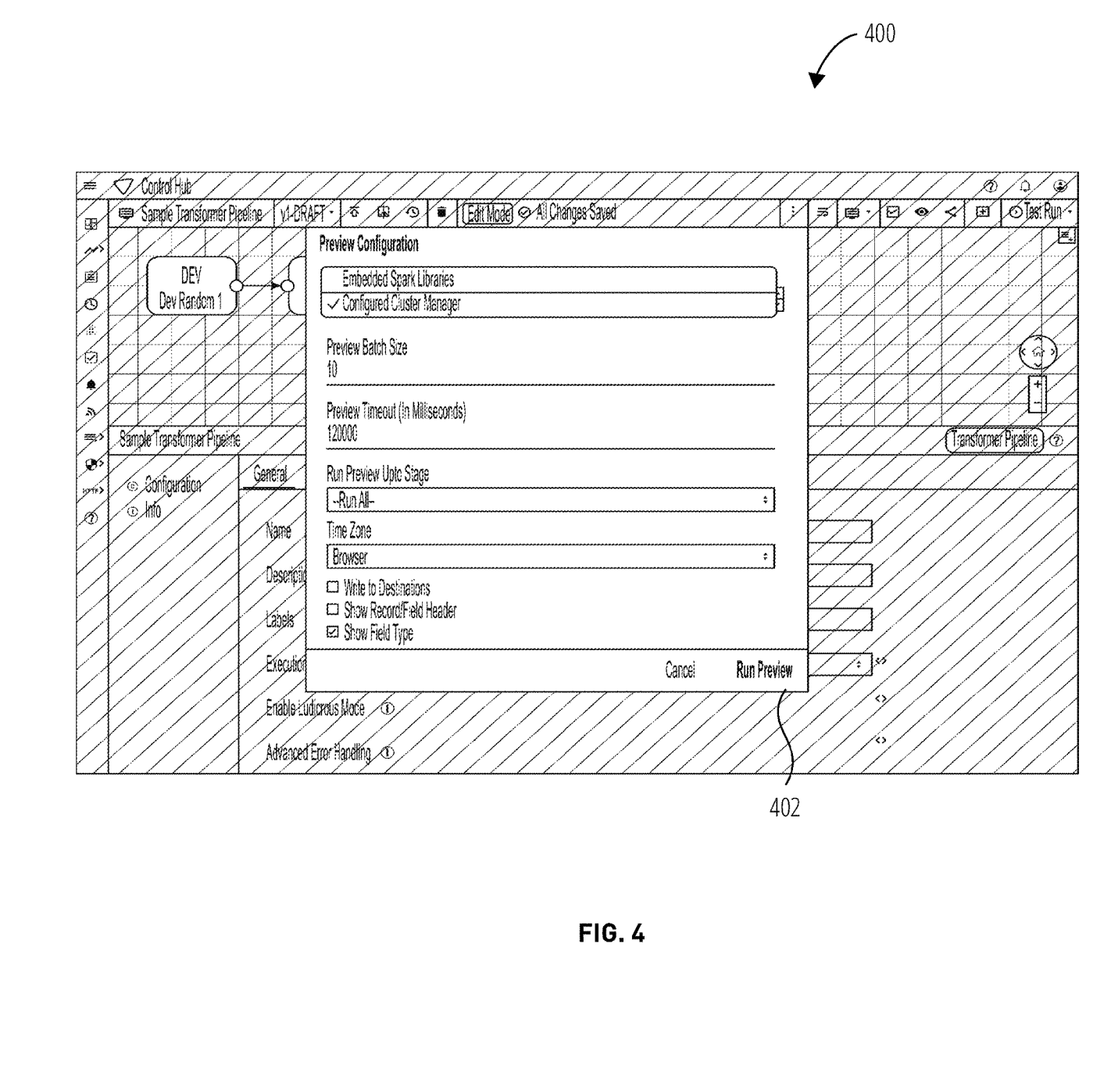
FIG. 4 is a diagrammatic illustration of an example graphical user interface of a user configuration window in the remote preview system, according to some example embodiments.

FIG. 4 is a diagrammatic illustration of an example graphical user interface of a user configuration window 400 of the remote preview system 112, according to some example embodiments. For example, the remote preview system 112 receives user input specifying which portions of the data pipeline should be processed by the software framework. In response to receiving a selection of user interface element 402, the remote preview system 112 performs operation 302 as described above.

Figure 5:
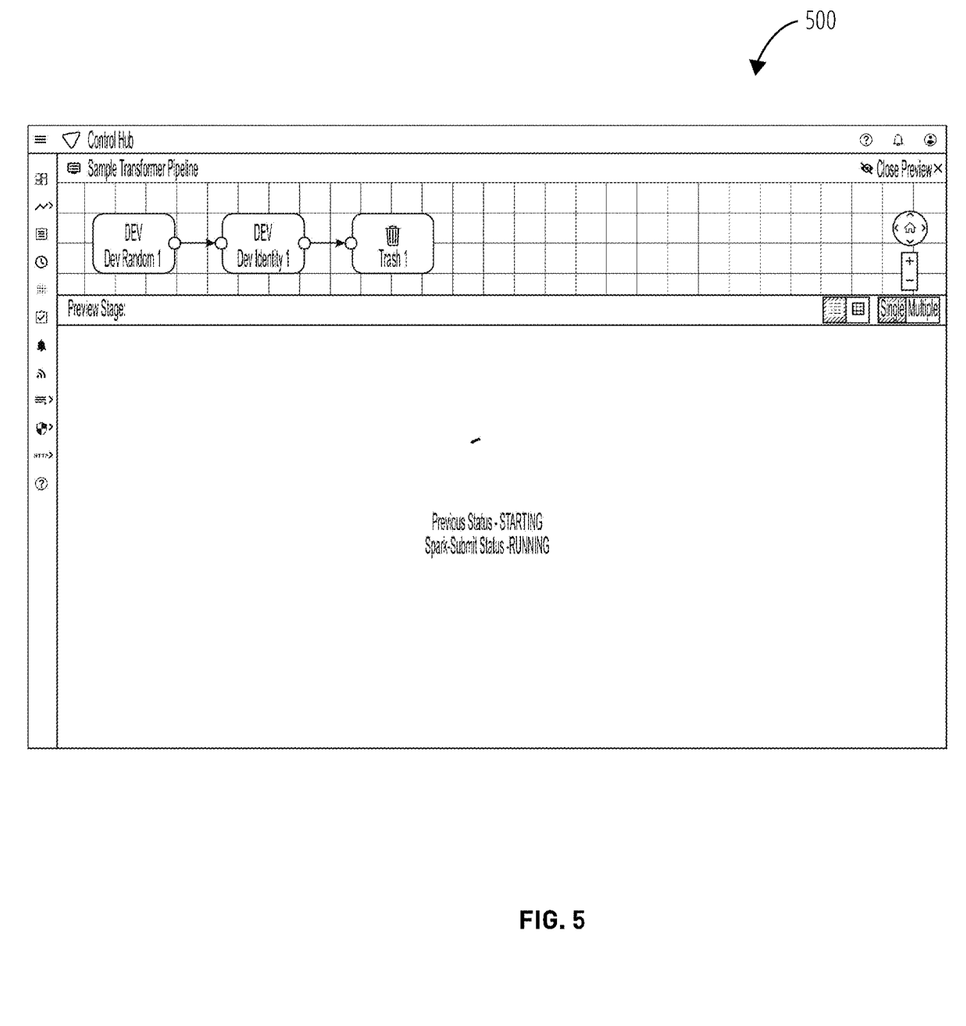
FIG. 5 is a diagrammatic illustration of an example graphical user interface of an updated status window in the remote preview system, according to some example embodiments.

FIG. 5 is a diagrammatic illustration of an example graphical user interface of an updated status window 500 of the remote preview system 112, according to some example embodiments. After operation 306, the remote preview system 112 dynamically updates the graphical user interface to indicate a current status of the data pipeline processing operations. For example, the remote preview system 112 may modify the graphical user interface to confirm that the data pipeline configuration file was successfully submitted and that operation 306 is currently in progress.

Figure 6:
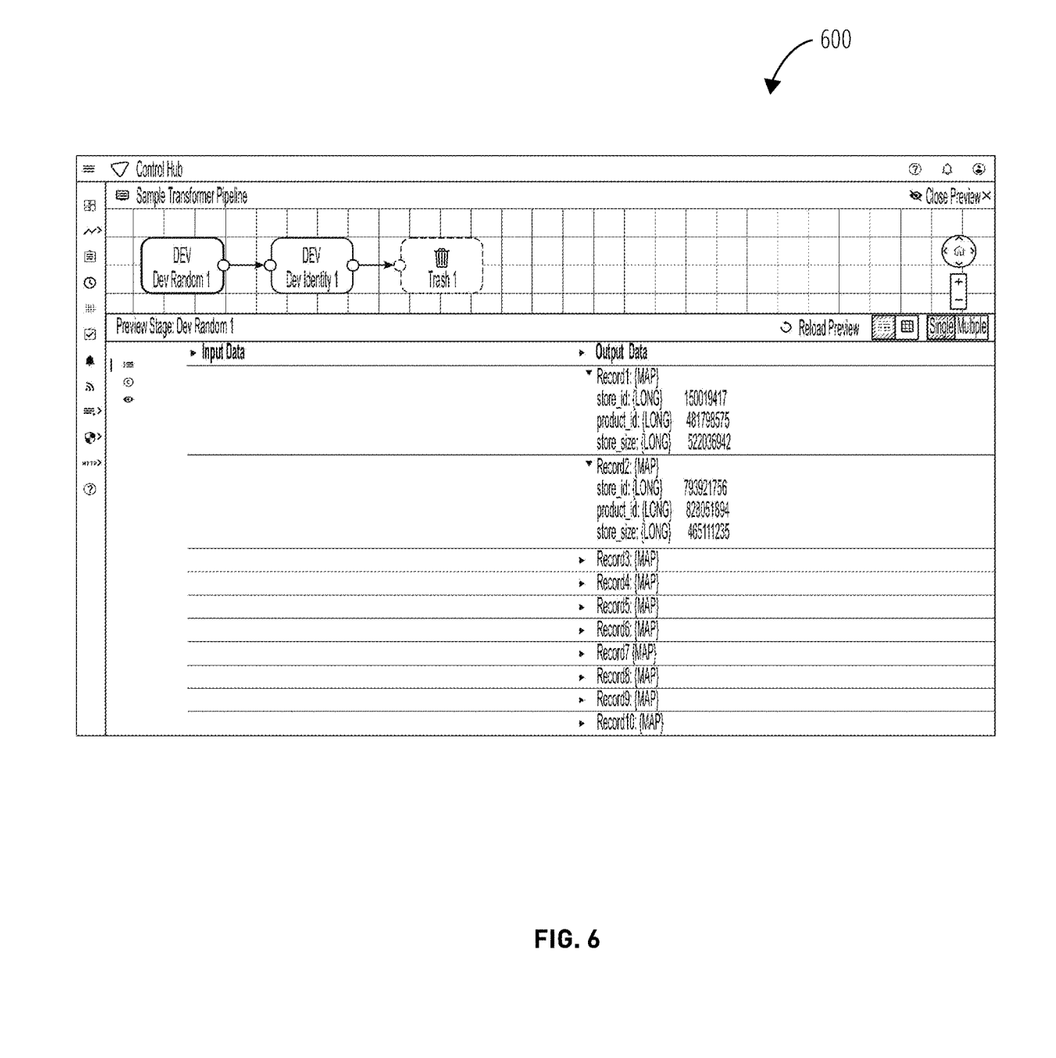
FIG. 6 is a diagrammatic illustration of an example graphical user interface of an updated results window in the remote preview system, according to some example embodiments.

FIG. 6 is a diagrammatic illustration of an example graphical user interface of an updated results window 600 of the remote preview system 112, according to some example embodiments. For example, at operation 310, the remote preview system 112 modifies the graphical user interface to display the results window 600. The results window 600 may display the data transformed as a result of operation 306. In some examples, the results window 600 may display error notifications about failure in the data pipeline. The results window 600 may be used to validate performance of the data pipeline.

Figure 7:
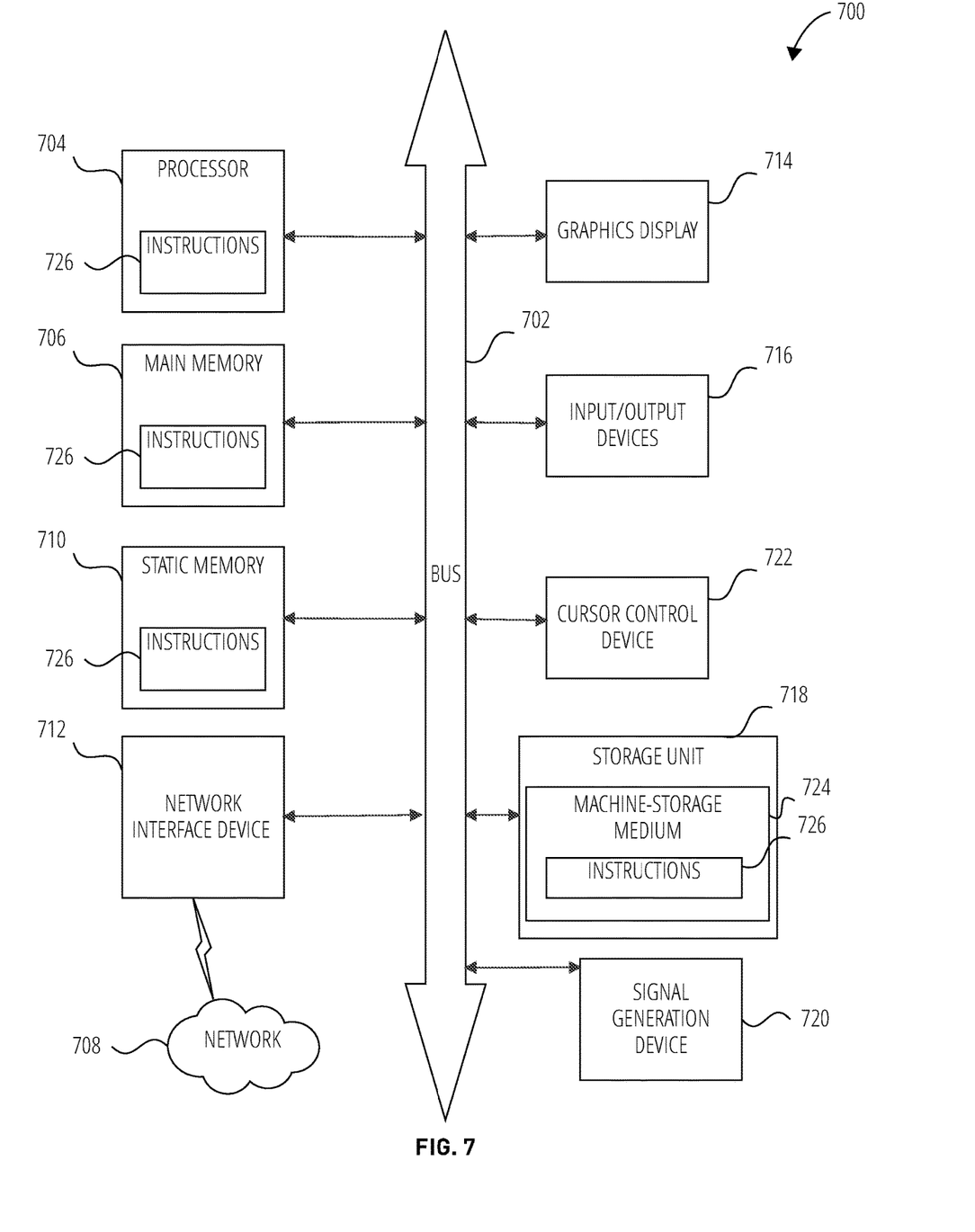
FIG. 7 shows a diagrammatic representation of a machine in the example form of a computer system within which a set of instructions, for causing the machine to perform any one or more of the methodologies discussed herein, may be executed, according to some example embodiments.

FIG. 7 illustrates components of a machine 700, according to some example embodiments, that is able to read instructions from a machine-storage medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 726 (e.g., software, a program, an application, an applet, an app, or other executable code) for causing the machine 700 to perform any one or more of the methodologies discussed herein may be executed, in whole or in part.

For example, the instructions 726 may cause the machine 700 to execute the flow diagrams of FIG. 3. In one embodiment, the instructions 726 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 726 (sequentially or otherwise) that specify actions to be taken by that machine. Further, while only a single machine is illustrated, the term "machine" shall also be taken to include a collection of machines that individually or jointly execute the instructions 726 to perform any one or more of the methodologies discussed herein.

The machine 700 includes a processor 704 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 706, and a static memory 710, which are configured to communicate with each other via a bus 702. The processor 704 may contain microcircuits that are configurable, temporarily or permanently, by some or all of the instructions 726 such that the processor 704 is configurable to perform any one or more of the methodologies described herein, in whole or in part. For example, a set of one or more microcircuits of the processor 704 may be configurable to execute one or more modules (e.g., software modules) described herein.

The machine 700 may further include a graphics display 714 (e.g., a plasma display panel (PDP), a light emitting diode (LED) display, a liquid crystal display (LCD), a projector, or a cathode ray tube (CRT), or any other display capable of displaying graphics or video). The machine 700 may also include an input device 716 (e.g., a keyboard), a cursor control device 722 (e.g., a mouse, a touchpad, a trackball, a joystick, a motion sensor, or other pointing instrument), a storage unit 718, a signal generation device 720 (e.g., a sound card, an amplifier, a speaker, a headphone jack, or any suitable combination thereof), and a network interface device 712.

The storage unit 718 includes a machine-storage medium 724 (e.g., a tangible machine-readable storage medium) on which is stored the instructions 726 (e.g., software) embodying any one or more of the methodologies or functions described herein. The instructions 726 may also reside, completely or at least partially, within the main memory 706, within the processor 704 (e.g., within the processor's cache memory), or both, before or during execution thereof by the machine 700. Accordingly, the main memory 706 and the processor 704 may be considered as machine-readable media (e.g., tangible and non-transitory machine-readable media). The instructions 726 may be transmitted or received over a network 708 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 706, 710, and/or memory of the processor 704) and/or storage unit 718 may store one or more sets of instructions and data structures (e.g., software) embodying or utilized by any one or more of the methodologies or functions described herein. These instructions, when executed by processor(s) 704 cause various operations to implement the disclosed embodiments.

As used herein, the terms "machine-storage medium," "device-storage medium," "computer-storage medium" (referred to collectively as "machine-storage medium 724") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 724 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 724 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 726 may further be transmitted or received over a communications network 726 using a transmission medium via the network interface device 712 and utilizing any one of a number of well-known transfer protocols (e.g., HTTP). Examples of communication networks 708 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 726 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for generating a remote preview of a data pipeline comprising:
   receiving, via a user interface, an indication the data pipeline to be processed, wherein a first portion of the data pipeline is stored on a first computing device and a second portion of the data pipeline is stored on a second computing device;
   generating a data pipeline configuration file describing operations in the first portion and the second portion of the data pipeline;
   causing a cluster-computing framework, using an application programming interface (API), to perform operations corresponding to the first portion and the second portion of the data pipeline, the causing being based on the data pipeline configuration file;
   receiving, from the cluster-computing framework, results of the operations corresponding to the first portion and the second portion of the data pipeline, the results comprising data transformed by the operations; and
   causing presentation of the results on a graphical user interface of a third computing device.

2. The method of claim 1, wherein the first, second and third computing device form a cluster of computing devices, each computing device in the cluster using the cluster-computing framework.

3. The method of claim 1, further comprising:
   transmitting offset information of the data pipeline to the cluster-computing framework, the offset information providing information on how to restart the data pipeline from a last batch of data that was processed.

4. The method of claim 1, wherein receiving the indication of the data pipeline further comprises:
   presentation of a user configuration window, the user configuration window providing user interface elements for specifying the data pipeline to be processed; and detecting, via the user configuration window, user input specifying the data pipeline to be processed by the cluster-computing framework.

5. The method of claim 1, wherein the results comprise data transformed by the operations performed by the cluster-computing framework.

6. The method of claim 5, wherein the results further comprise error notifications due to a failure in the data pipeline.

7. The method of claim 1, wherein the data pipeline is displayed on the graphical user interface of the computing device, and the causing presentation of the results further comprising:
modifying the graphical user interface of the computing device to cause presentation of the results.

8. A computing apparatus, the computing apparatus comprising:
one or more processors; and
a memory storing instructions that, when executed by the one or more processors, cause the one or more processors to perform operations comprising:
receiving, via a user interface, an indication a data pipeline to be processed, wherein a first portion of the data pipeline is stored on a first computing device and a second portion of the data pipeline is stored on a second computing device;
generating a data pipeline configuration file describing operations in the first portion and the second portion of the data pipeline;
causing a cluster-computing framework, using an application programming interface (API), to perform operations corresponding to the first portion and the second portion of the data pipeline, the causing being based on the data pipeline configuration file;
receiving, from the cluster-computing framework, results of the operations corresponding to the first portion and the second portion of the data pipeline, the results comprising data transformed by the operations; and
causing presentation of the results on a graphical user interface of a third computing device.

9. The computing apparatus of claim 8, wherein the data pipeline configuration file further comprises data pipeline credential information.

10. The computing apparatus of claim 8, the operations further comprising:
transmitting offset information of the data pipeline to the cluster-computing framework, the offset information providing information on how to restart the data pipeline from a last batch of data that was processed.

11. The computing apparatus of claim 8, wherein receiving the indication of the data pipeline further comprises:
presentation of a user configuration window, the user configuration window providing user interface elements for specifying the data pipeline to be processed; and
detecting, via the user configuration window, user input specifying the data pipeline to be processed by the cluster-computing framework.

12. The computing apparatus of claim 8, wherein the results comprise data transformed by the operations performed by the cluster-computing framework.

13. The computing apparatus of claim 12, wherein the results further comprise error notifications due to a failure in the data pipeline.

14. The computing apparatus of claim 8, wherein the data pipeline is displayed on the graphical user interface of the computing device, and the causing presentation of the results further comprises:
modifying the graphical user interface of the computing device to cause presentation of the results.

15. A machine storage medium storing instructions that when executed by one or more processors of a machine, cause the machine to perform operations comprising:
receiving, via a user interface, an indication a data pipeline to be processed, wherein a first portion of the data pipeline is stored on a first computing device and a second portion of the data pipeline is stored on a second computing device;
generating a data pipeline configuration file describing operations in the first portion and the second portion of the data pipeline;
causing a cluster-computing framework, using an application programming interface (API), to perform operations corresponding to the first portion and the second portion of the data pipeline, the causing being based on the data pipeline configuration file;
receiving, from the cluster-computing framework, results of the operations corresponding to the first portion and the second portion of the data pipeline, the results comprising data transformed by the operations; and
causing presentation of the results on a graphical user interface of a third computing device.

16. The machine storage medium of claim 15, wherein the data pipeline configuration file further comprises data pipeline credential information.

17. The machine storage medium of claim 15, the operations further comprising:
transmitting offset information of the data pipeline to the cluster-computing framework, the offset information providing information on how to restart the data pipeline from a last batch of data that was processed.

18. The machine storage medium of claim 15, wherein receiving the indication of the data pipeline further comprises:
presentation of a user configuration window, the user configuration window providing user interface elements for specifying the data pipeline to be processed; and
detecting, via the user configuration window, user input specifying the data pipeline to be processed by the cluster-computing framework.

19. The machine storage medium of claim 15, wherein the results further comprise error notifications due to a failure in the data pipeline.

20. The machine storage medium of claim 19, wherein the results further comprise error notifications due to a failure in the data pipeline.

* * * * *